March 24, 1936.  J. S. Y. FRALICH ET AL  2,035,061
DRAIN DEVICE FOR RESERVOIRS
Filed Nov. 2, 1932  2 Sheets-Sheet 1
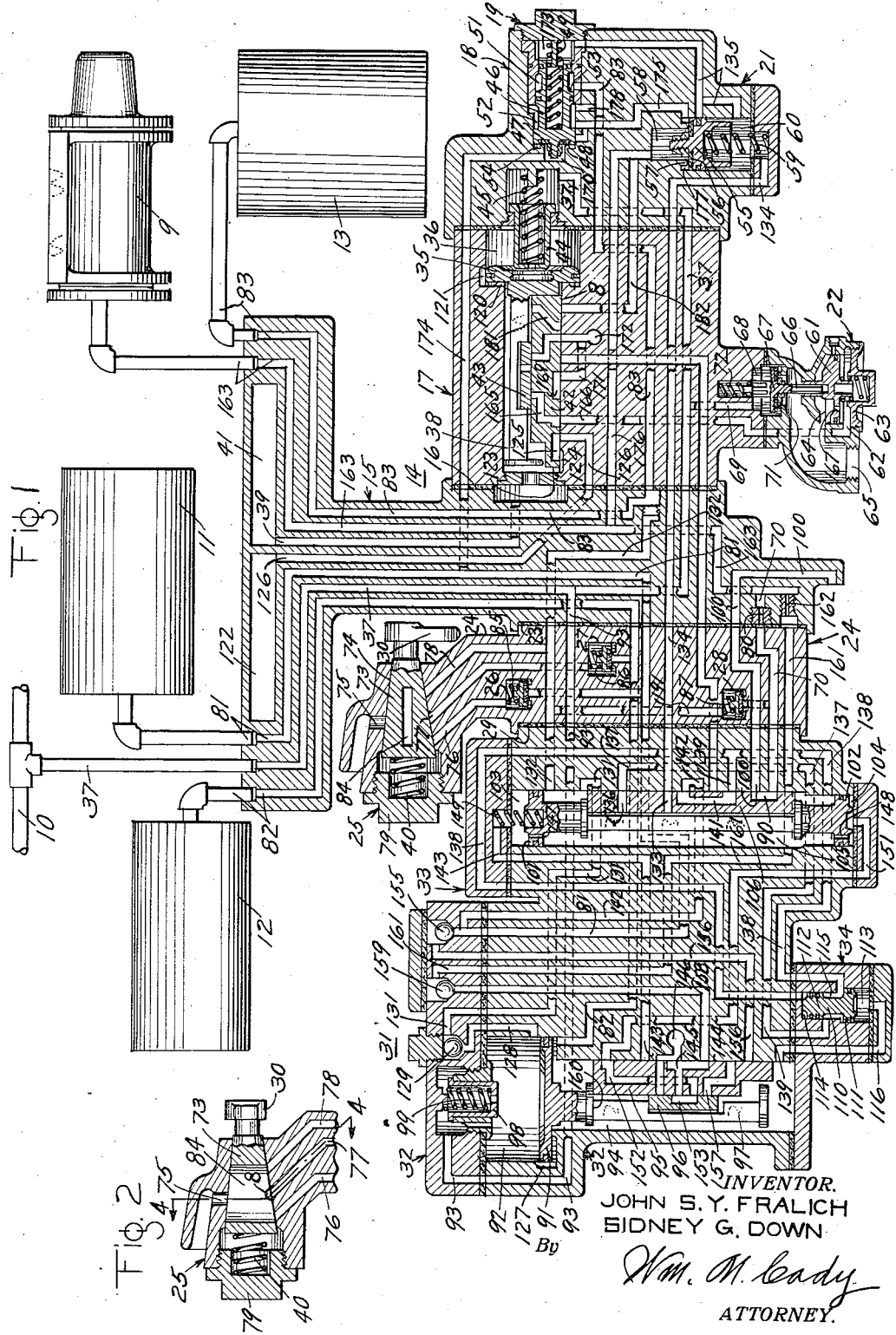
INVENTOR.
JOHN S. Y. FRALICH
SIDNEY G. DOWN
By Wm. M. Cady
ATTORNEY.

March 24, 1936. J. S. Y. FRALICH ET AL 2,035,061
DRAIN DEVICE FOR RESERVOIRS
Filed Nov. 2, 1932 2 Sheets-Sheet 2
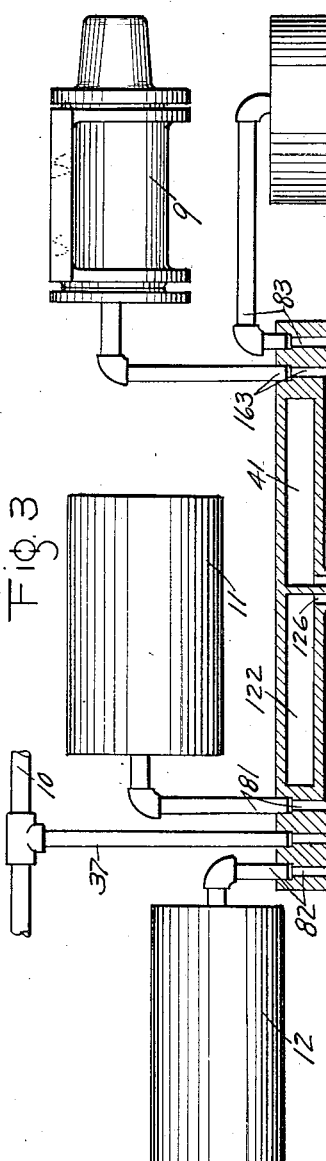
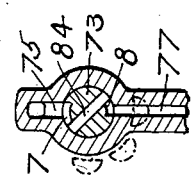
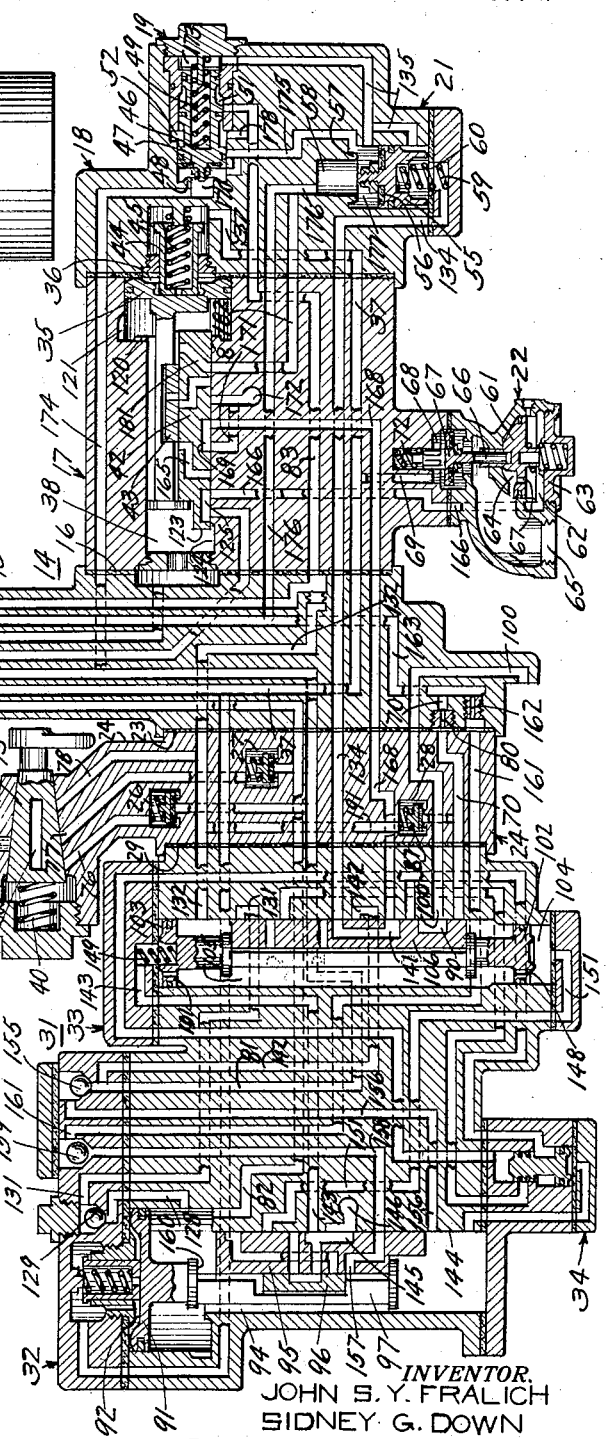
INVENTOR.
JOHN S. Y. FRALICH
SIDNEY G. DOWN
By Wm. M. Cady
ATTORNEY.

Patented Mar. 24, 1936

2,035,061

UNITED STATES PATENT OFFICE 2,035,061

DRAIN DEVICE FOR RESERVOIRS

John S. Y. Fralich, Chicago, Ill., and Sidney G. Down, Edgewood, Pa., assignors to The Westinghouse Air Brake Company, Wilmerding, Pa., a corporation of Pennsylvania Application November 2, 1932, Serial No. 640,854

17 Claims. (Cl. 303—80)

This invention relates to fluid pressure brakes and particularly to the type operated in accordance with variations in pressure in a brake pipe.

In the usual brake equipment employed to control the brakes of a passenger train, several reservoirs are carried by each car of the train, namely; sevice, auxiliary and emergency reservoirs, and the supply of fluid under pressure from the brake pipe to said reservoirs and from said reservoirs to the brake cylinder is controlled by a triple valve device which operates in accordance with variations in brake pipe pressure.

Under certain conditions, for example, when the cars of a train are set out from the train, it is desirable to reduce the pressure of fluid in such reservoirs and the brake cylinder independently of the triple valve device, and for this purpose each reservoir is provided with a release valve device that is operated by a trainman from the side of a car by means of an operating rod. Frequently the reservoirs are so arranged on the car that two of the reservoirs are on one side of the car while the third is on the other side thereof. Consequently, a trainman passing on one side of a car may neglect to open the release valves of the reservoir or reservoirs on the other side of the car, with the result that fluid pressure may be released fom a control valve chamber when the fluid pressure of one reservoir is reduced, while fluid under pressure supplied from another unrelieved reservoir is acting on the under face of the control valve, with the result that the higher pressure acting on the under or seated face of the valve lifts it from its seat and permits foreign particles to lodge between the valve and its seat. The presence of foreign particles between the valve and its seat, causes leakage and undue wear of the valve and seat and renders it inoperative, thereby necessitating expensive repair and temporary withdrawal of the car from service.

When a car is set out from a train or disconnected from the train pipe, the angle cock of the brake pipe of the set out car is usually opened, thereby reducing the brake pipe pressure at an emergency rate and causing an emergency application of the brakes which serves to hold the car in its set out position, while the hand brakes are being applied. When the fluid under pressure is released from the said reservoirs, fluid under pressure trapped within the brake cylinder and acting upon the seated face of the slide valve or valves associated therewith, may cause the valve or valves to be raised from their respective seats with the above mentioned detrimental consequences.

It is an object of this invention to provide fluid pressure brake equipment of the above noted character, with a brake controlling valve device that is provided with a drainage valve for either draining the auxiliary reservoir separately or for simultaneously releasing the fluid under pressure from the service, auxiliary and emergency reservoirs, and which constitutes a part of the brake controlling or triple valve device and which is actuated by a single operating rod or lever, so that when it is desired to drain all of the reservoirs of a set out car, the possibility of draining one or more reservoirs without draining all of them is eliminated, thereby insuring against displacement of the slide valves from their respective seats by reason of fluid under pressure from an unrelieved reservoir acting on the seated faces of the valves.

A further object of the invention is to provide a brake controlling valve device having means for simultaneously releasing the fluid under pressure from the usual reservoirs, with means whereby the fluid under pressure within the brake cylinder is released when the pressure of the fluid of one of said reservoirs falls below a predetermined value, so as to insure concurrent drainage of the brake cylinder and render the fluid under pressure therein ineffective to lift the associated slide valve, or valves, from their respective seats as the reservoirs are draining.

A further object of the invention is to provide a fluid pressure brake controlling equipment having the above noted characteristics wherein the brake cylinder is vented through a passage connected to one of the reservoirs controlled by a drainage valve and having a check valve for preventing a return flow of fluid from the reservoir to the brake cylinder, thereby insuring drainage of the brake cylinder when the drainage valve is open and eliminating the necessity for a manually operable valve for draining the brake cylinder.

If it were possible for the operator to manually operate a release valve to release fluid from the brake cylinder, failure of the operator to subsequently close it would prevent a build up of fluid pressure within the brake cylinder and the brake equipment would therefore be incapable of making an application of the brakes on the associated car.

A further object of the invention is to provide a fluid pressure brake equipment having the above noted apparatus for releasing fluid under pressure from the several reservoirs and brake cylinders, wherein the release valve mechanism is simple and inexpensive to manufacture and may readily be applied to present equipment with only relatively slight alterations.

These and other objects of the invention that will be made apparent throughout the further description thereof are obtained by means of the brake equipment hereinafter described and illustrated in the accompanying drawings, wherein Fig. 1 is a diagrammatic view, mainly in section, of a fluid pressure brake equipment embodying features of the invention and showing the triple valve device in release position and the reservoir drainage valve device in closed position;

Fig. 2 is a fragmental sectional view of the drainage valve device in open position;

Fig. 3 is a view similar to that shown in Fig. 1 showing the triple valve device in brake application position; and Fig. 4 is a fragmental transverse sectional view of the drainage valve taken on the broken line 4—4 of Fig. 2.

Referring to the drawings and particularly to Fig. 1, the invention is shown as applied to fluid pressure brake equipment and just so much of the construction and operation will be specifically described as is necessary to show the relation of the improved mechanism to the brake equipment to which it is applied, which equipment comprises a brake pipe 10, a service reservoir 11, an auxiliary reservoir 12, an emergency reservoir 13, a brake cylinder device 9 and a brake controlling or triple valve device 14.

The controlling valve device 14 is made of sections that are adapted to be joined with gaskets therebetween and maintained in assembled relation by means of bolts, not shown. The sections include a pipe bracket section 15 to which the brake pipe and reservoir pipes are connected and which also serves to support the remaining sections of the triple valve device. The pipe bracket is adapted to be secured to the car by means of an attaching bracket, not shown.

Upon one face 16 of the pipe bracket 15 an emergency valve section 17 is attached and to this section, a valve section 18 is connected containing an intercepting valve device 19 and a high pressure valve device 21. A quick action vent valve device 22 is also associated with the emergency valve section.

Upon one attaching face 23 of the pipe bracket section 15, a drainage valve section 24 is secured and this section contains, in addition to various passages for fluid, a manually operable drain valve device 25 and three check valves 26, 27, and 28, which check valve devices are employed in connection with certain features of the present invention, and the purpose thereof will hereinafter be described.

To the attaching face 29 of the drainage valve section 24, is attached the equalizing valve section 31 containing an equalizing valve device 32, a release valve device 33 and a charging valve device 34.

The emergency application valve portion or section 17 contains an emergency piston 35 having at one side a chamber 36, open to the brake pipe 10 through passage and pipe 37, and at the opposite side a valve chamber 38 open through passage 39 to the quick action chamber 41, said valve chamber containing a main slide valve 42 and an auxiliary slide valve 43 adapted to be operated by said piston. A spring stop member 44 actuated by a spring 45 serves to yieldingly oppose movement of the emergency piston 35 toward the right or emergency brake application position.

The intercepting valve device 19 contained within the valve section 18 comprises a valve piston 46 having at one end a valve disc 47 adapted to seat upon an annular seat rib 48 upon which it is normally yieldingly retained by a spring 49. The valve piston 46 is surrounded by two annular chambers 51 and 52 separated by an intermediate piston head 53 of the valve piston. A valve chamber 54 is disposed at the left end of the valve piston and is closed by the valve disc 47 when the latter is seated upon the seat rib 48.

The high pressure valve device 21 comprises a valve piston 55 having a valve disc 56 adapted to seat upon an annular seat rib 57 surrounding a chamber 58, and is normally yieldingly retained in seated position by a spring 59 disposed within the chamber 60 beneath the valve piston 55.

The quick action vent valve 22 comprises a quick action piston 61 having at one side a chamber 62, the open end of which is closed by a cover plate 63, and at the other side a chamber 64 open to the atmosphere through a passage 65. The quick action piston operatively engages a stem 66 of a brake pipe vent valve 67 which is contained in a chamber 68, said chamber being open to the brake pipe 10 through passage 69 leading to the brake pipe passage 37. The vent valve 67 is normally pressed into engagement with a seat rib 71 by means of a spring 72.

The drainage valve device 25 comprises a valve 73 of the tapered plug type adapted to fit snugly within a tapered bore 74 and to control communication between a port 75 open to the atmosphere and passages 76, 77, and 78 which respectively communicate with the reservoirs 11, 12, and 13 through the pipes and passages 81, 82, and 83 respectively. When the plug valve 73 is in open position, as shown in Fig. 2, the passages 76, 77, and 78 and consequently the reservoirs 11, 12 and 13 are concurrently open to the atmosphere through a port 84 which connects said passages with the atmospheric passage 75.

Grooves 7 and 8 in the peripheral surface of the plug valve 73 leading from the port 84, serve to connect the passage 77, which communicates with the auxiliary reservoir 12, when the plug valve is in the position shown in Fig. 4, with the atmospheric port 75. The purpose of this provision will hereinafter appear.

The chamber or bore 74 containing the plug valve 73 is closed at one end by the small end of the plug valve and at the other end by a threaded nut 79. The plug valve is held seated by a spring 40 interposed between the nut and the plug valve and is manually operable through the medium of an operating handle 30 secured to the small end thereof.

The check valves 26, 27, and 28 in the drainage valve section are of the disc type and each being subject to the pressure of springs 85, 86, and 87 respectively, prevent back flow of fluid through passages 76, 77, and 191.

The equalizing valve portion or section 32 contains an equalizing piston 91 having on one side a piston chamber 92 open to the brake pipe 10 through passage 93 and passage and pipe 37, and on the other side a valve chamber 94 containing a main slide valve 95 and a graduating valve 96 operated by said piston 91 through the medium of a stem 97. The valve chamber 94 is open to the auxiliary reservoir 12 through passage and pipe 82. A spring stop member 98 within chamber 92 and cooperating with a spring 99, serves to yieldingly limit movement of the equalizing piston 91.

The release valve device comprises a differential piston having piston heads 101 and 102 operating in the respective piston chambers 103 and 104 and having an intermediate valve chamber 105. The differential piston operates a slide valve 106 contained in valve chamber 105.

The charging valve 34 comprises a valve piston 110 having two heads 111 and 112 operating in the respective chambers 113 and 114 and having an annular intermediate chamber 115. The chamber 113 is open to the equalizing valve chamber 94 through a passage 116.

In charging the system, fluid under pressure flows from the brake pipe 10 through pipe and passage 37 to the emergency piston chamber 36 and then flows through the feed grooves 121 and 120 to the emergency valve chamber 38 and thence to the quick action chamber 41 through passage 39 and to the quick action closing chamber 122 through groove 124, cavity 125 in the slide valve 42 and passage 126.

Fluid under pressure also flows from the brake pipe 10 and pipe and passage 37 to the equalizing piston chamber 92 through passage 93 and thence through the feed groove 127 around the piston 91 to the equalizing valve chamber 94. From the equalizing valve chamber 94, fluid under pressure flows to the auxiliary reservoir 12 through the passage 82 and to the chamber 113 beneath the valve piston 110 through passage 116. From the equalizing piston chamber 92 fluid under pressure flows to the release slide valve chamber 105 through passage 128 past the ball check valve 129 and passage 131.

Fluid under pressure flows from the release slide valve chamber 105 to the emergency reservoir 13 through passages 132 and 83, and to the chamber 60 beneath the valve piston 55 of the high pressure valve device 21 through port 133 in the release slide valve 106 and passage 134, and thence through passage 135 to the chamber 173 at the right side of the valve piston 46 of the intercepting valve device 19.

Fluid under pressure flows from the emergency reservoir 13 to the intermediate chambers 52 and 51 of the intercepting valve through pipe and passage 83 and branch passage 178.

Fluid under pressure flows from the release slide valve chamber 105 to the service reservoir 11 through port 136 in the release slide valve 106, passage 137, intermediate chamber 115 of the charging valve device 34, passage 138, passage 139, cavity 141 in the release slide valve 106, passages 142 and passage and pipe 81.

The release valve piston heads 101 and 102 are provided with restricted passages 147 and 148, respectively, which permit fluid under pressure supplied from the emergency reservoir to the intermediate chamber 105, to flow to the chambers at the outer faces of the piston heads 101 and 102 and to act upon the upper and lower faces of the piston head 101 and the upper face of the piston head 102 and the outer seated area of the lower face thereof.

With the equalizing slide valve 95 in release position, the inner seated area of the under side of the piston head 102 is open to the atmosphere through the passage 151, port 152 in the slide valve 95, cavity 153 in the graduating valve 96, cavity 145 in the slide valve 95 and atmospheric passage 146, and consequently the release valve device is held in its release position by the pressure of spring 149 plus emergency reservoir pressure acting on the unbalanced area of the piston 101 equal to the inner seated area of the piston 102.

With the release slide valve 106 in release position, communication is established from the brake cylinder 9 to atmosphere through pipe and passage 163, passage 78 having a restricted passage 80, cavity 90 in the release slide valve and atmospheric passage 100.

In operation, with the equipment fully charged and with the control valve parts in the release position as shown in Fig. 1, a service application of the brakes is made by moving the brake valve device, not shown, to service position for effecting a reduction in brake pipe pressure at a service rate.

The reduction in fluid pressure in the passage 93 connected to the brake pipe through passage 37, reduces the fluid pressure within the equalizing piston chamber 92, and the greater pressure of the fluid acting on the inner face of the piston 91 causes it to move to its upper or application position as shown in Fig. 3.

With the equalizing slide valve 95 and graduating valve 96 in service position, the passage 143 leading from the chamber 103 on the upper side of the release valve piston head 101 to the seat 144 of the equalizing slide valve 95, is open to the atmosphere through cavity 145 in the main slide valve and atmospheric passage 146.

With the equalizing piston and valves in the service position, the passage 151 leading from the chamber 104 at the under side of the piston head 102 to the seat 144 of the equalizing slide valve 95 is blanked by the slide valve, and fluid under pressure flowing from the chamber 105 to the chamber 104 through the port 148 in the piston head 102 and acting on the lower face thereof forces the release valve piston and the release slide valve 106 to upper or application position shown in Fig. 3 against the action of spring 149, since the upper face of the piston head 101 is subjected to atmospheric pressure, as indicated above.

With the equalizing slide valve 95 in application position, as shown in Fig. 3, communication from the service reservoir 11 to the equalizing valve chamber 94 is established through pipe and passage 81, past the ball check valve 155 and passage 156. The auxiliary reservoir 12 is at all times open to the equalizing valve chamber 94 through pipe and passage 82, so that fluid supplied from the service and auxiliary reservoirs flows from the valve chamber 94, to the brake cylinder 9, through port 157 in the equalizing slide valve 95, passage 158, past the ball check valve 159, passage 161, restricted passage 162, and passage and pipe 163, thus causing a service application of the brakes to be effected at a rate of flow as governed by the area of the restricted passage 162.

To hold the brakes applied, the engineman's brake valve, not shown, is moved to lap position, in which position further venting of fluid from the brake pipe is cut off. When the flow of fluid under pressure from the auxiliary and service reservoirs to the brake cylinder has reduced the fluid pressure in the equalizing valve chamber 94 slightly below that remaining in the piston chamber 92, the greater fluid pressure therein acting on the upper face of the piston 91, moves the equalizing piston and graduating valve 96 down to service lap position. In this position, service port 157 is blanked by the graduating valve 96 and flow of fluid under pressure to the brake cylinder 9 is stopped. Further movement of the piston 91 is prevented by the shoulder 160 of the piston stem 97 engaging the upper end of the slide valve 95. The slight difference in pressure which was sufficient to move the piston 91 and graduating valve 96 is unable to overcome the added resistance of the slide valve, hence there is no further movement of the piston and the brakes are held applied.

Assuming the brake equipment to be fully charged, and the parts in release position, in order to make an emergency application of the brakes, the engineman's brake valve, not shown, is moved to emergency position, for reducing the brake pipe pressure at an emergency rate. The equalizing portion of the control valve device just described will operate as in making a reduction in brake pipe pressure at a service rate. The reduction in brake pipe pressure at an emergency rate causes a corresponding reduction in fluid pressure in the emergency piston chamber 36 through passage 37. The greater fluid pressure acting within the emergency valve chamber 38 on the inner face of the piston 35 moves the piston to emergency application position shown in Fig. 3, which carries with it the graduating valve 43 and the slide valve 42. In passing to emergency position, and before the slide valve 42 has moved, the graduating valve 43 uncovers port 165 in the slide valve 42, which registers with the passage 166 leading from the chamber 62 of the quick action vent valve device 22, to the slide valve seat 124.

Fluid under pressure then flows to the quick action piston chamber 62 of the quick action vent valve device 22 from the quick action chamber 41 through passage 39, emergency valve chamber 38, port 165 in the slide valve 42 and passage 166, and from the quick action closing chamber 122 through passage 126, cavity 125 in the slide valve 42 and passage 166, forcing the piston 61 upward to the position shown in Fig. 3, and thereby opening the quick action vent valve 67 and locally venting fluid under pressure from the brake pipe 10 at a rapid rate through passages 37 and 69 and atmospheric passage 65. This rapid local venting of the fluid from the brake pipe initiates a similar action of the emergency valve device of the succeeding car of the train and thus a reduction in brake pipe pressure at an emergency rate is rapidly propagated throughout the length of the train.

When the emergency slide valve has moved into emergency application position, the port 165 in the slide valve 42 is blanked and communication is established from the quick action closing chamber 122 to the quick action vent valve piston chamber 62 through passage 126, cavity 125 in the slide valve 42 and passage 166 through which fluid under pressure may flow from the quick action closing chamber to the vent valve piston chamber 62 and maintain the piston 61 in the upper position until the fluid pressure in the quick action closing chamber is reduced below a predetermined value by the flow of fluid under pressure from the chamber 62 through a vent 167 in the piston 61 leading to the chamber 64 that is open to the atmosphere through passage 65.

Fluid under pressure supplied from the quick action closing chamber to the quick action piston chamber therefore serves to maintain the vent valve 67 in open position for a predetermined time for insuring transmission of the quick action operation of the equipment in the well known manner. Venting of fluid from the quick action piston chamber through the vent 167 insures closure of the vent valve after a lapse of time so that the brake pipe pressure can be subsequently restored when desired.

With the emergency slide valve 42 in emergency application position, communication from the chamber 60 beneath the piston 55 of the high pressure valve device 21, to the atmosphere, is established through passage 134, cavity 141 in the release slide valve 106, passage 168, cavity 169 in the emergency slide valve 42, passage 171 and atmospheric passage 172. Since the chamber 173 at the right end of the intercepting valve piston 46 of the intercepting valve device 19 is open to the chamber 60 beneath the high pressure valve piston 55, the fluid pressure within the chamber 173 is atmospheric momentarily or until the piston 55 is forced downwardly and closes the lower branch of passage 135.

The chamber 170 at the left end of the intercepting valve piston 46 is open to the service reservoir 11 through passage 174 and passage and pipe 81, and the fluid under pressure supplied to chamber 170 acting on the inner seated area of the valve piston 46, moves it to the right against the action of the spring 49, thereby uncovering passage 175 and establishing communication from the chamber 170 to the chamber 58 above the valve piston 55 of the high pressure valve device 21, through the passage 175, and subjecting the upper end of the valve piston 55 to service reservoir pressure, which moves the valve piston 55 to its lower position against the action of the spring 59.

With the valve piston 55 in its lower position, the valve seat 56 is separated from the seat rib 57 and communication is established from the chamber 170 and the service reservoir 11 to the brake cylinder 9 through passage 175, chambers 177 and 58, passage 176 and passage and pipe 163 through which fluid flows from the service reservoir 11 to the brake cylinder 9. The flow of fluid from the service reservoir causes a quick drop in service reservoir pressure acting on the left end of the intercepting valve piston 46, and as the right end of the valve piston 46 is subjected, when the valve piston 55 is in lower or open position, to fluid under pressure supplied from the service reservoir through passage 176, chamber 177, above valve piston 55 and passage 135, the fluid pressures acting on the ends of the valve piston 46 equalize and the spring 49 moves the valve piston 46 to the left position wherein the passage 175 is blanked and further flow of fluid from the service reservoir to the brake cylinder is prevented.

When the brake pipe pressure is reduced at an emergency rate, the equalizing valve device and the release valve device function as when the brake pipe pressure is reduced at a service rate to supply fluid under pressure from the auxiliary reservoir 12 to the brake cylinder 9 in the manner above described.

With the intercepting valve piston in its left position, and the high pressure valve piston in its lower or open position, fluid under pressure flows from the emergency reservoir 13 to the brake cylinder through pipe and passage 83, passage 178, annular chamber 52 surrounding the intercepting valve piston 46, passage 175, high pressure valve chamber 177, chamber 58, passage 176 and passage and pipe 163.

In operation, the release slide valve 106 in moving to its upper or application position shown in Fig. 3, blanks the passage 70 leading to the brake cylinder and prevents the escape of fluid under pressure therefrom which is subsequently supplied thereto from the service, auxiliary and emergency reservoirs in the manner above described.

With the emergency slide valve 42 in emergency application position, as shown in Fig. 3, communication is established from the quick action chamber 41 to the brake cylinder 9 through passage 39, emergency valve chamber 38, port 181 in the slide valve 42, passage 182, passage 176 and passage and pipe 163, for maintaining the fluid pressure within the quick action chamber against leakage and to thereby insure that sufficient fluid pressure is maintained in the emergency valve chamber 38 to hold the emergency piston in emergency position.

In order to release the brakes, after making an emergency application, the engineman's brake valve device is turned to release position wherein the brake pipe is supplied with fluid under pressure for increasing the brake pipe pressure. Since emergency piston chamber 36 is open to the brake pipe 10 through passage and pipe 37, the pressure of the fluid in the chamber 36 increases with the increase in brake pipe pressure. However, the emergency piston will not be moved to release position until the fluid pressure in the chamber 36 is sufficient to overcome the fluid pressure within the emergency valve chamber 38. While the fluid pressure is building up and is still insufficient to move the emergency piston, the equalizing piston 91 is moved to release position when the fluid under pressure acting thereon is sufficient to overcome the auxiliary reservoir pressure within the equalizing valve chamber 94.

Movement by the piston 91 of the equalizing slide valve 95 and graduating valve 96 to release position, opens communication from the chamber 104 beneath the release piston head 102 to atmosphere through passage 151, port 152 in the slide valve 95, cavity 153 in the graduating valve 96, cavity 145 in the slide valve 95 and atmospheric passage 146, and blanks the passage 143 leading from the chamber 103 at the upper face of the release piston head 101.

Fluid at emergency reservoir pressure within the intermediate chamber 105 flows to the chamber 103 through port 147 in the piston head 101 and acts on the upper face thereof and forces it downwardly when the fluid pressure is relieved in the chamber 104 in the manner described.

With the release valve in release position, the brake cylinder is open to the atmosphere through pipe and passage 163, restricted passage 80 in the passage 70, cavity 90 in the release slide valve 106 and atmospheric passage 100.

With the release slide valve 106 in release position, fluid under emergency reservoir pressure is supplied from the release valve chamber 105 to the chamber 60 beneath the high pressure valve piston 55 through port 133 in the release slide valve 106 and passage 134, and this fluid under pressure acting on the under face of the high pressure valve piston 55, balances emergency reservoir pressure acting on the upper face of the valve piston and permits the spring 59 to return the valve piston to its closed position, thereby cutting off communication between the emergency reservoir and the brake cylinder through passage 175, chambers 177 and 58, passage 176 and passage and pipe 163.

Since the brake cylinder is open to atmosphere in the manner above described and the emergency reservoir 13 is cut off from the brake cylinder, when the release valve 106 is in its lower or release position, it follows that the fluid pressure within the emergency valve chamber 38, which chamber is connected, when the emergency valve is in the right or emergency application position, with the quick action reservoir and brake cylinder in the manner above described, will fall. When the increasing brake pipe pressure then acting on the emergency piston 35 overcomes the falling brake cylinder and quick action reservoir pressure within the emergency valve chamber 38, the piston 35 is moved to release position.

The parts are now in release position and the system is maintained charged when the engineman's brake valve device is turned from release position to running position in the manner described.

When a car is set off from a train, it is customary to open the brake pipe angle cock of the car after it has been set off so as to apply the brakes on the car for holding it until the hand brakes have been applied. It has been the custom to next drain the system of fluid under pressure by opening the individual drain cocks of the several reservoirs. It has been found that if one of the reservoirs should not be drained, the fluid pressure therein may act on the seat of a valve when there is atmospheric pressure on the opposite face of the valve, so that the valve may be lifted from its seat, thus permitting foreign particles to become lodged between the valve and its seat with resultant damage and delay in making repairs. Accordingly, the improved control valve device is provided with a drain valve device which insures simultaneous draining of all reservoirs and also ensures drainage of the brake cylinder through one of the passages connected to one of the reservoirs.

When the brake equipment of the system is in normal operation, the drain plug valve 73 is maintained in the closed position, shown in Fig. 1, blanking the passages 76, 77, and 78, which are respectively connected to the service reservoir 11, the auxiliary reservoir 12 and the emergency reservoir 13, through passages 81, 82, and 83, respectively, as previously explained.

When it is desired to drain the system of a set out car, the plug valve 73 is turned to the open position shown in Fig. 2, wherein the passages 76, 77, and 78 are simultaneously open to the atmosphere through the port 84 in the plug valve. Fluid at auxiliary reservoir pressure is normally supplied to the equalizing valve chamber 94 and acts upon the outer face of the equalizing valve 95 and tends to retain it upon its seat. When the equalizing valve is in application position its seat face is subjected to emergency reservoir pressure, supplied from the release valve chamber 105 through port 148 in the release piston head 102, chamber 104 and passage 151 which terminates at the equalizing valve seat.

Should the auxiliary reservoir be drained without draining the emergency reservoir, the fluid under emergency reservoir pressure in passage 151 may lift the equalizing valve 95 from its seat. By insuring that the emergency reservoir is drained coincident with the auxiliary reservoir, this lifting of the equalizing valve is prevented.

Fluid under emergency reservoir pressure is normally supplied to the release valve chamber 105, and acts upon the outer face of the release valve 106 and tends to retain it upon its seat. When the release valve 106 is in its application position, its seat face is subjected to service reservoir pressure through pipe and passage 81 and passage 142, which latter passage terminates at the release valve seat. The face of the release valve 106 is also subjected to fluid under auxiliary reservoir pressure supplied from the equalizing valve chamber 94, when the equalizing valve is in its application position, through passage 128, past the ball check valve 129 and passage 131, which latter passage terminates at the seat of the release slide valve. The face of the release slide valve 106 is further subjected to fluid under brake cylinder pressure supplied from the brake cylinder 9 through pipe and passage 163, restricted passage 80 in passage 70, which latter passage terminates at the seat of the release slide valve 106.

Should the emergency reservoir 13 be drained without simultaneously draining the auxiliary and service reservoirs or the brake cylinder, the fluid under pressure acting on the seated face of the release slide valve 106 and supplied thereto as above described, may force the release slide valve momentarily from its seat.

Draining the service and auxiliary reservoirs simultaneously with the emergency reservoir, insures against the occurrence of pressure conditions which would cause lifting of the release slide valve from its seat by fluid supplied from the service and auxiliary reservoirs.

It remains, however, to prevent the fluid at brake cylinder pressure supplied to the seated face of the release slide valve 106 from lifting the release slide valve when the emergency reservoir and the connected release valve chamber 105 are drained. There are several alternatives for insuring simultaneous drainage of the emergency reservoir and brake cylinder. A passage from the brake cylinder might be provided leading to the plug valve 84 but this would be objectionable because it would increase the length of the plug valve beyond that found to be practicable for valves of that character and because of the possibility of sufficient leakage occurring between the emergency reservoir passage 78 and the referred to passage to the brake cylinder, to cause an accidental application of the brakes.

To obviate these conditions, a separate drain valve might be applied to the brake cylinder but this arrangement would be objectionable because the drain valve might be inadvertently allowed to remain open after the car is placed in a train and an application of the brakes on that car would be prevented so long as the drain valve remained open.

To insure drainage of the brake cylinder simultaneously with the emergency reservoir, without resorting to the undesirable expedients mentioned above, the passage 70, which is always open to the brake cylinder 9, is connected to the passage 132, which is open to the emergency reservoir 13, by a passage 191, so that when the cock 73 is turned to its venting position, and fluid is vented from the emergency reservoir, fluid will also be simultaneously vented from the brake cylinder by way of the passage 191.

In order to prevent back flow from the emergency reservoir to the brake cylinder, a check valve 28 is interposed in the passage 191.

When the emergency reservoir pressure has been reduced, as by the opening of the cock 73, to a degree such that the brake cylinder pressure will overcome the reduced emergency reservoir pressure plus the pressure of spring 87, the check valve will be lifted from its seat, permitting the venting of fluid from the brake cylinder through passage 191.

Since the auxiliary, service and emergency reservoirs and the brake cylinder are drained simultaneously there are no pressure conditions created while the system is being drained that will cause lifting of the slide valves from their respective seats.

While there are no passages leading from any of the reservoirs and the brake cylinder to the seat of the emergency slide valve 42 that would supply fluid under pressure tending to lift the emergency slide valve from its seat while the slide valve is in emergency application position, the simultaneous draining of the said reservoirs and the brake cylinder would be equally effective for preventing lifting of the emergency slide valve from its seat, as in the case of the equalizing slide valve and the release slide valve, should occasion demand that communicating passages from the said sources of fluid supply be blanked by the emergency slide valve when the latter is in the emergency application position.

Since the emergency reservoir pressure may at times exceed the pressures of the service and auxiliary reservoirs, the check valves 26 and 27 are provided in the passages 76 and 77, respectively, which communicate respectively with the service and auxiliary reservoirs, in order to prevent fluid under emergency reservoir pressure in the passage 78 from flowing to said reservoirs through passages 76 and 77 in the event of leakage of the plug valve 73.

Should the auxiliary reservoir 12, during the operation of the brake equipment of the train become overcharged, an unintentional application of the brakes will result. In this event, a simple remedy is to drain sufficient fluid under pressure from the auxiliary reservoir to enable the fluid at brake pipe pressure acting on the face of the equalizing piston 91 to move the piston to the release position shown in Fig. 1. This is accomplished by moving the plug valve 73 to its intermediate position shown in Fig. 4, wherein the grooves 7 and 8 establish communication from the auxiliary reservoir 12 through pipe and passage 82, passage 77, groove 8, port 84, groove 7 and atmospheric passage 75. Fluid is thus drained from the auxiliary reservoir until the brakes are released in the manner above described. This reduction in auxiliary reservoir pressure in the valve chamber 94 is insufficient to cause unseating of the valve 95.

While but a single embodiment of the invention is disclosed herein, it is obvious that omissions and additions and other changes in the construction may be made without departing from the spirit of the invention.

Having now described our invention, what we claim as new and desire to secure by Letters Patent, is:

1. In a fluid pressure brake, the combination with a brake pipe, a brake cylinder, a plurality of reservoirs normally charged with fluid under pressure, and a brake controlling valve device having a casing and operated upon variations in brake pipe pressure to supply fluid under pressure from said reservoirs to said brake cylinder and connected through passages in the casing to said brake cylinder and said reservoirs, of a single manually operated valve element on said casing for opening and closing communication between said passages leading to said reservoirs and the atmosphere, a branch passage interconnecting said brake cylinder and one of said reservoirs, and check valve means in said branch passage operative to permit one-way flow of fluid under pressure therepast from the brake cylinder.

2. In a fluid pressure brake, the combination with a brake pipe, a brake cylinder, a plurality of reservoirs normally charged with fluid under pressure, and a brake controlling valve device having a casing and operated upon variations in brake pipe pressure to supply fluid under pressure from said reservoirs to said brake cylinder and connected through passages in the casing to said brake cylinder and said reservoirs, of a single manually operated plug valve on said casing having a single port communicating with said passages leading to said reservoirs for simultaneously venting fluid under pressure from said reservoirs when the said plug valve is in one position, and for venting fluid under pressure from only one of said reservoirs when the said plug valve is in another position.

3. In a fluid pressure brake, the combination with a brake pipe, a brake cylinder, a plurality of reservoirs normally charged with fluid under pressure, of a brake controlling valve device having a sectional casing provided with communicating passages connecting said valve device with said reservoirs and said brake cylinder for supplying fluid under pressure from said reservoirs to said brake cylinder, operated upon variations in brake pipe pressure, a casing section interposed between said casing sections and having communicating passages establishing communication between the passages of one casing and those of another casing and having passages leading from the atmosphere to said communicating passages leading to said reservoirs, a manually operated valve device for controlling said passages leading from the atmosphere, a branch passage interconnecting said brake cylinder and one of the atmospheric passages, and check valve means in said branch passage for permitting one-way flow of fluid under pressure from the brake cylinder to the atmospheric passage, whereby fluid under pressure from said brake cylinder may also be vented through the manually operated valve device.

4. In a fluid pressure brake, the combination with a brake pipe, a brake cylinder, a plurality of reservoirs normally charged with fluid under pressure, and a brake controlling valve device having a casing and operated upon variations in brake pipe pressure to supply fluid under pressure from said reservoirs to said brake cylinder and connected through passages in the casing to said brake cylinder and said reservoirs, of a valve device on said casing and cooperating with said passages leading to said reservoirs for venting fluid under pressure from said reservoirs, and check valves in certain of said reservoir passages for preventing fluid leaking past said valve device from one of said passages connected to one reservoir from flowing to another of said passages connected to another reservoir or to said brake controlling valve device.

5. In a fluid pressure brake, the combination with a brake pipe, a brake cylinder, a plurality of reservoirs normally charged with fluid under pressure, of a brake controlling valve device having a sectional casing provided with communicating passages connecting said valve device with said reservoirs and said brake cylinder for supplying fluid under pressure from said reservoirs to said brake cylinder, operated upon variations in brake pipe pressure, a casing section interposed between said casing sections and having communicating passages establishing communication between the passages of one casing and those of another casing and having passages leading from the atmosphere to said communicating passages leading to said reservoirs, a manually operated valve device on said interposed casing section for controlling said passages leading from the atmosphere, a branch passage interconnecting said brake cylinder and one of the atmospheric passages, and check valve means in said branch passage for permitting only one-way flow of fluid under pressure from the brake cylinder to the atmospheric passage, whereby venting of fluid under pressure from the brake cylinder through said manually operated valve device may be effected simultaneously with the venting of fluid under pressure from the reservoirs.

6. In a fluid pressure brake, the combination with a brake pipe, a brake cylinder, a plurality of reservoirs normally charged with fluid under pressure, of a brake controlling valve device having a sectional casing provided with communicating passages connecting said valve device with said reservoirs and said brake cylinder for supplying fluid under pressure from said reservoirs to said brake cylinder, operated upon variations in brake pipe pressure, a casing section interposed between said casing sections and having communicating passages establishing communication between the passages of one casing and those of another casing and having passages leading from the atmosphere to said communicating passages leading to said reservoirs, a manually operated valve device on said interposed casing section for controlling said passages leading from the atmosphere, and check valves in the interposed section in certain of said last said passages for preventing fluid leaking past said valve device from one last said passage connected to one reservoir from flowing to another last said passage connected to another reservoir or to said brake controlling valve device.

7. In a fluid pressure brake, the combination with a brake pipe, a brake cylinder, a reservoir normally charged with fluid under pressure and a brake controlling valve device operated upon variations in brake pipe pressure to supply fluid under pressure from said reservoir to said brake cylinder, of a valve device for venting fluid from said reservoir, and a fluid pressure responsive check valve device operated when said reservoir pressure is reduced a predetermined amount for venting fluid under pressure from said brake cylinder.

8. In a fluid pressure brake, the combination with a brake pipe, a brake cylinder, a reservoir normally charged with fluid under pressure and a brake controlling valve device operated upon variations in brake pipe pressure to supply fluid under pressure from said reservoir to said brake cylinder, of a valve device for venting fluid from said reservoir, and a fluid pressure responsive check valve device operated when said reservoir pressure is reduced a predetermined amount for venting fluid under pressure through said valve device from said brake cylinder.

9. In a fluid pressure brake, the combination with a brake pipe, a brake cylinder, a reservoir normally charged with fluid under pressure and having a passage connecting the reservoir with said brake cylinder and a brake controlling valve device operated upon variations in pressure in said brake pipe for controlling said passage and supplying fluid under pressure from said reservoir to said brake cylinder, of a valve device connected in said passage for venting fluid under pressure from said reservoir and a check valve device in said passage between said brake cylinder and said reservoir responsive to variations in pressure differences in said reservoir and said brake cylinder for venting fluid under pressure from said brake cylinder.

10. In a fluid pressure brake, the combination with a brake pipe, a brake cylinder, a reservoir normally charged with fluid under pressure and a brake controlling valve operated upon variations in brake pipe pressure to supply fluid under pressure from said reservoir to said brake cylinder and subjected to fluid under pressure from said brake cylinder acting on the valve seat face of the valve tending to lift it from its seat and to fluid under pressure supplied from said reservoir and acting on its opposite face and tending to retain said valve upon its seat, of means for insuring the simultaneous draining of fluid from said reservoir and said brake cylinder whereby the said reservoir and said brake cylinder are simultaneously drained so as to prevent such differences in pressure acting on said valve while said reservoir and said brake cylinder are being drained as would cause lifting of said valve from its seat, said means including a manually operable valve for venting fluid from said reservoir and a fluid pressure actuated valve actuated by fluid under pressure supplied from said brake cylinder when the reservoir pressure falls below a predetermined value for venting fluid from said brake cylinder.

11. In a fluid pressure brake, the combination with a brake pipe, a brake cylinder, a reservoir normally charged with fluid under pressure and a brake controlling valve operated upon variations in brake pipe pressure to supply fluid under pressure from said reservoir to said brake cylinder and subjected to fluid under pressure from said brake cylinder acting on the valve seat face of the valve tending to lift it from its seat and to fluid under pressure supplied from said reservoir and acting on its opposite face and tending to retain said valve upon its seat, of means for insuring the simultaneous draining of fluid from said reservoir and said brake cylinder whereby the said reservoir and said brake cylinder are simultaneously drained so as to prevent such differences in pressure acting on said valve while said reservoir and said brake cylinder are being drained as would cause lifting of said valve from its seat, said means including a manually operable valve for venting fluid from said reservoir to the atmosphere when in open position and a fluid pressure actuated valve actuated by fluid under pressure supplied from said brake cylinder when the reservoir pressure falls below a predetermined value, for venting fluid from said brake cylinder to the atmosphere through said open manually operated valve.

12. In a fluid pressure brake, the combination with a brake pipe, a brake cylinder, a reservoir normally charged with fluid under pressure and a brake controlling valve operated upon variations in brake pipe pressure to supply fluid under pressure from said reservoir to said brake cylinder and subjected to fluid under pressure from said brake cylinder acting on the valve seat face of the valve tending to lift it from its seat and to fluid under pressure supplied from said reservoir and acting on its opposite face and tending to retain said valve upon its seat, of means for insuring the simultaneous draining of fluid from said reservoir and said brake cylinder whereby the said reservoir and said brake cylinder are simultaneously drained so as to prevent such differences in pressure acting on said valve while said reservoir and said brake cylinder are being drained as would cause lifting of said valve from its seat, said means including a manually operable valve for venting fluid from said reservoir and a check valve actuated by fluid under pressure supplied from said brake cylinder when the reservoir pressure falls below a predetermined value for venting fluid from said brake cylinder and for preventing the flow of fluid from said reservoir through said check valve to said brake cylinder.

13. In a fluid pressure brake apparatus, the combination with a brake cylinder and a brake controlling valve device having a reservoir normally charged with fluid under pressure, of a manually operable valve device for venting fluid from said reservoir and having a passage through which fluid is vented from the brake cylinder by way of the communication through which fluid is vented from the reservoir, and a check valve for preventing back flow from the reservoir to the brake cylinder.

14. In a fluid pressure brake, the combination with a brake pipe, a brake cylinder, a plurality of reservoirs normally charged with fluid under pressure, and a brake controlling valve device having a casing and operated upon variations in brake pipe pressure to supply fluid under pressure from said reservoirs to said brake cylinder and connected through passages in the casing to said brake cylinder and said reservoirs, of a single valve element on said casing and cooperating with said passages leading to said reservoirs adapted when in one position to vent fluid under pressure from one reservoir only and when in another position to vent fluid under pressure concurrently from all said reservoirs.

15. In a fluid pressure brake apparatus, the combination with a brake controlling valve device having a plurality of reservoirs normally charged with fluid under pressure, of a manually operable valve adapted when in one position to vent fluid under pressure from one reservoir only, and when in another position to vent fluid under pressure concurrently from all said reservoirs.

16. In a fluid pressure brake, the combination with a brake pipe, a brake cylinder, a plurality of reservoirs normally charged with fluid under pressure, and a brake controlling valve device having a casing and operated upon variations in brake pipe pressure to supply fluid under pressure from said reservoirs to said brake cylinder and connected through passages in the casing to said brake cylinder and said reservoirs, of a single manually operated valve element on said casing and cooperating with said passages leading to said reservoirs for venting fluid under pressure from said reservoirs, a branch passage interconnecting two of the passages leading, respectively, to the brake cylinder and one of the reservoirs, and check valve means in said branch passage for permitting flow of fluid under pressure only from the brake cylinder to the reservoir passage, whereby fluid under pressure from the said brake cylinder may be vented through the manually operated valve element simultaneously with the venting of fluid under pressure from the reservoirs.

17. In a fluid pressure brake, in combination, a brake pipe, a brake cylinder, a reservoir normally charged with fluid under pressure, a brake controlling valve device conditioned upon a reduction in brake pipe pressure to cause fluid under pressure to be supplied from the reservoir to the brake cylinder to effect an application of the brakes, and upon an increase in brake pipe pressure to cause fluid under pressure to be vented from the brake cylinder to effect release of the brakes, means operative to reduce the reservoir pressure below brake cylinder pressure when the valve device is conditioned to effect an application of the brakes, means providing a communication through which fluid under pressure may flow from the brake cylinder to the reservoir independently of the condition of the valve device, and check valve means for preventing back flow of fluid under pressure from the reservoir to the brake cylinder through the said communication.

JOHN S. Y. FRALICH.
SIDNEY G. DOWN.